United States Patent

Horng et al.

(10) Patent No.: US 10,122,225 B2
(45) Date of Patent: Nov. 6, 2018

(54) INNER-ROTOR MOTOR

(71) Applicant: Sunonwealth Electric Machine Industry Co., Ltd., Kaohsiung (TW)

(72) Inventors: Alex Horng, Kaohsiung (TW);
Tso-Kuo Yin, Kaohsiung (TW);
Duo-Nian Shan, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 201 days.

(21) Appl. No.: 15/131,108

(22) Filed: Apr. 18, 2016

(65) Prior Publication Data
US 2016/0329771 A1 Nov. 10, 2016

(30) Foreign Application Priority Data

May 6, 2015 (TW) .............................. 104114484 A

(51) Int. Cl.
*H02K 5/02* (2006.01)
*H02K 1/18* (2006.01)
*H02K 5/04* (2006.01)
*H02K 5/06* (2006.01)
*H02K 5/173* (2006.01)
(Continued)

(52) U.S. Cl.
CPC ............. *H02K 1/185* (2013.01); *H02K 5/04* (2013.01); *H02K 5/06* (2013.01); *H02K 5/1732* (2013.01); *H02K 11/33* (2016.01); *H02K 5/22* (2013.01)

(58) Field of Classification Search
CPC ............ H02K 1/00; H02K 1/18; H02K 1/185; H02K 1/27; H02K 5/00; H02K 5/04; H02K 5/06; H02K 5/17; H02K 5/173; H02K 5/1732; H02K 5/22; H02K 11/33
See application file for complete search history.

(56) References Cited

U.S. PATENT DOCUMENTS 4,823,032 A * 4/1989 Ward ...................... H02K 5/08
310/43
6,787,949 B2 * 9/2004 Bostwick ................ H02K 5/10
310/59
(Continued)

FOREIGN PATENT DOCUMENTS

CN 101764446 A 6/2010
CN 202602439 U 12/2012
(Continued)

*Primary Examiner* — Tran Nguyen
(74) *Attorney, Agent, or Firm* — Alan D. Kamrath; Kamrath IP Lawfirm, P.A.

(57) ABSTRACT

An inner-rotor motor includes a separating member, a stator and a rotor. The separating member is made of an insulating material and includes a first separating part and a second separating part. The separating member includes at least one engaging portion extending along an axial direction of the inner-rotor motor. The stator includes an iron core received in a space jointly defined by the first and second separating parts. The iron core includes at least one engaging groove arranged on an outer surface thereof and extending along the axial direction of the inner-rotor motor. The at least one engaging portion is received in the at least one engaging groove. The rotor is rotatably coupled to the separating member. As such, a convenient assembly and reduced volume of the inner-rotor motor are provided.

20 Claims, 8 Drawing Sheets

(51) Int. Cl.
*H02K 11/33* (2016.01)
*H02K 5/22* (2006.01)

(56) References Cited

U.S. PATENT DOCUMENTS

| 6,849,974 B2* | 2/2005 | Howe | H02K 5/08 |
| | | | 29/596 |
| 8,288,914 B2 | 10/2012 | Qin et al. | |
| 2006/0071566 A1* | 4/2006 | Ha | H02K 5/08 |
| | | | 310/89 |

FOREIGN PATENT DOCUMENTS

| EP | 1617540 A1 | 1/2006 |
| JP | 2013176183 A | 9/2013 |
| TW | M297577 U | 9/2006 |

* cited by examiner

INNER-ROTOR MOTOR

CROSS REFERENCE TO RELATED APPLICATIONS

The application claims the benefit of Taiwan application serial No. 104114484, filed on May 6, 2015, and the subject matter of which is incorporated herein by reference.

BACKGROUND OF THE INVENTION

1. Field of the Invention

The present invention generally relates to an inner-rotor motor and, more particularly, to an inner-rotor motor having a separating member.

2. Description of the Related Art

A conventional inner-rotor motor includes an outer metallic housing and several components arranged in the metallic housing, such as a stator iron core, a driving circuit and a bearing. In this arrangement, electricity may be conducted between the metallic housing and the components, leading to the generation of a leakage current in the conventional inner-rotor motor.

To overcome this problem, another conventional inner-rotor motor 9 is provided as shown in FIG. 1. The inner-rotor motor 9 includes a stator 91 and a separating member 92. The separating member 92 is made of a non-conductive, plastic material and is used to receive the stator 91. The separating member 92 may be coupled with a metallic housing 93 for insulating purposes, to prevent the generation of a leakage current between the stator 91 and the metallic housing 93. Such a conventional inner-rotor motor 9 can be seen in Taiwan Patent No. M297577.

The separating member 92 is in the form of a cylindrical wall. Therefore, the stator 91 must be fastened with the separating member 92 to prevent relative rotation therebetween. The stator 91 includes a first screwing portion 911, and the separating member 92 includes a second screwing portion 921 aligned with the first screwing portion 911. In this arrangement, the separating member 92 can be fastened to the stator 91 using a screw "S." However, since the separating member 92 is coupled to the stator 91 by fastening, the assembly of the inner-rotor motor 9 is inconvenient. Additionally, a single pair of the first and second screwing portions 911 and 912 may not be sufficient to provide a secure engagement between the separating member 92 and the stator 91. Thus, two or more pairs of the first and second screwing portions 911 and 912 are needed to fasten the separating member 92 to the stator 91 in a secure manner via the use of multiple screws "S." Disadvantageously, the assembly of the inner-rotor motor 9 is even more inconvenient.

Furthermore, the separating member 92 is fastened to the metallic housing 93 using the same screw "S." Since the separating member 92 is in the form of the cylindrical wall, the screw "S" must be arranged outwards of an outer surface of the separating member 92 to fasten the separating member 92 and the metallic housing 93 to each other. A radial length of the inner-rotor 9 motor is thus increased by the screw "S" arranged outwards of the outer surface of the separating member 92. Namely, when the separating member 92 is in the form of the cylindrical wall, arrangement of the screw "S" will certainly increase the volume of the inner-rotor motor 9.

Moreover, since a circuit or a coil inside the stator 91 has to be electrically connected to power or an actuator outside the inner-rotor motor 9 via a conducting wire, it is necessary to maintain a space between the separating member 92 and the metallic housing 93 for the conducting wire to extend through. However, arrangement of the space between the separating member 92 and the metallic housing 93 may further increase the volume of the inner-rotor motor 9.

In light of the above, it is necessary to improve the inner-rotor motor 9 to solve the problems of inconvenient assembly and large volume occupation.

SUMMARY OF THE INVENTION

It is therefore the objective of this invention to provide an inner-rotor motor that includes a separating member having at least one first engaging portion, as well as an iron core having at least one engaging groove arranged on an outer surface of the iron core for receiving the protrusion. Thus, convenient assembly of the inner-rotor motor is provided.

The present invention provides an inner-rotor motor including a separating member, a stator and a rotor. The separating member is made of an insulating material and includes a first separating part and a second separating part. The separating member includes at least one engaging portion extending along an axial direction of the inner-rotor motor. The stator includes an iron core received in a space jointly defined by the first and second separating parts. The iron core includes at least one engaging groove arranged on an outer surface thereof and extending along the axial direction of the inner-rotor motor. The at least one engaging portion is received in the at least one engaging groove. The rotor is rotatably coupled to the separating member.

In a form shown, the rotor includes a shaft arranged at a center of the iron core. Each of the at least one engaging groove extends towards the shaft. The at least one engaging portion protrudes inwards towards the iron core.

In the form shown, the first separating part includes a base plate extending along a radial direction of the inner-rotor motor. A lateral wall is connected to the base plate and extends along the axial direction of the inner-rotor motor towards the second separating part, and the at least one engaging portion includes at least one first engaging portion arranged on the lateral wall of the first separating part.

In the form shown, the second separating part includes a base plate extending along the radial direction of the inner-rotor motor. A lateral wall is connected to the base plate and extends along the axial direction of the inner-rotor motor towards the first separating part. The at least one engaging portion further includes at least one second engaging portion arranged on the lateral wall of the second separating part and extending along the axial direction of the inner-rotor motor.

In the form shown, a quantity of the at least one first engaging portion is larger than or equal to a quantity of the at least one second engaging portion. Each of the at least one second engaging portion is aligned with a respective one of the at least one first engaging portion.

In the form shown, the at least one first engaging portion includes a plurality of first engaging portions. The at least one second engaging portion includes a plurality of second engaging portions. Each of the plurality of second engaging portions is aligned with a respective one of the plurality of first engaging portions along the axial direction of the inner-rotor motor.

In the form shown, the at least one first engaging portion includes a plurality of first engaging portions. The at least one second engaging portion also includes a plurality of second engaging portions aligned with the plurality of first engaging portions along the axial direction of the inner-rotor motor. The first separating part includes a first channel arranged at one of the plurality of first engaging portions, and the second separating part includes a second channel arranged at one of the plurality of second engaging portions.

In the form shown, the first separating part includes a first coupling portion arranged in the first channel, and the second separating part includes a second coupling portion arranged in the second channel and coupled to the first coupling portion.

In the form shown, the first coupling portion is in a form of a fastener. The second coupling portion is in a form of a fastening groove. The first and second coupling portions are coupled to each other via the fastener and the fastening groove.

In the form shown, the inner-rotor motor further includes a metallic housing receiving the separating member.

In the form shown, a screwing member extends through the metallic housing, the first channel and the second channel to fasten the separating member in the metallic housing.

In the form shown, the metallic housing includes a body in a form of a hollow cylinder having two openings formed at two opposite ends thereof. The body encloses the first and second separating parts of the separating member. Two lids are arranged respectively at the two openings of the body, and each of the two lids includes a fastening hole arranged at an outer area adjacent to an outer edge thereof. The fastening hole is aligned with the one of the plurality of first engaging portions and the one of the plurality of second engaging portions. The screwing member extends through the fastening holes of the two lids to fix the separating member between the two lids.

In a further form shown, the separating member further includes a through-hole arranged at the first separating part or the second separating part. A wire extends out of the separating member via the through-hole, and the wire is received in the first channel or the second channel.

In the form shown, the inner-rotor motor further includes a circuit board received in the space defined by the first and second separating parts together. One end of the wire is electrically connected to the circuit board, and another end of the wire extends along the first channel or the second channel.

In the form shown, a coil is arranged around an outer periphery of the iron core of the stator. One end of the wire is electrically connected to the coil, and another end of the wire extends along the first channel or the second channel.

In the form shown, the first channel is in a form of a receiving groove formed on an outer surface of the lateral wall of the first separating part, and the second channel is also in a form of a receiving groove formed on an outer surface of the lateral wall of the second separating part. Alternatively, the first channel is in a form of an extending hole extending through two opposite sides of the one of the plurality of first engaging portions along the axial direction of the inner-rotor motor, and the second channel is also in a form of another extending hole extending through two opposite sides of the one of the plurality of second engaging portions along the axial direction of the inner-rotor motor.

According to the above, the at least one engaging portion and the at least one engaging groove extend along the axial direction of the inner-rotor motor. The at least one engaging portion is received in the at least one engaging groove for fixing the iron core relative to the separating member. Thus, a convenient assembly of the motor is provided.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
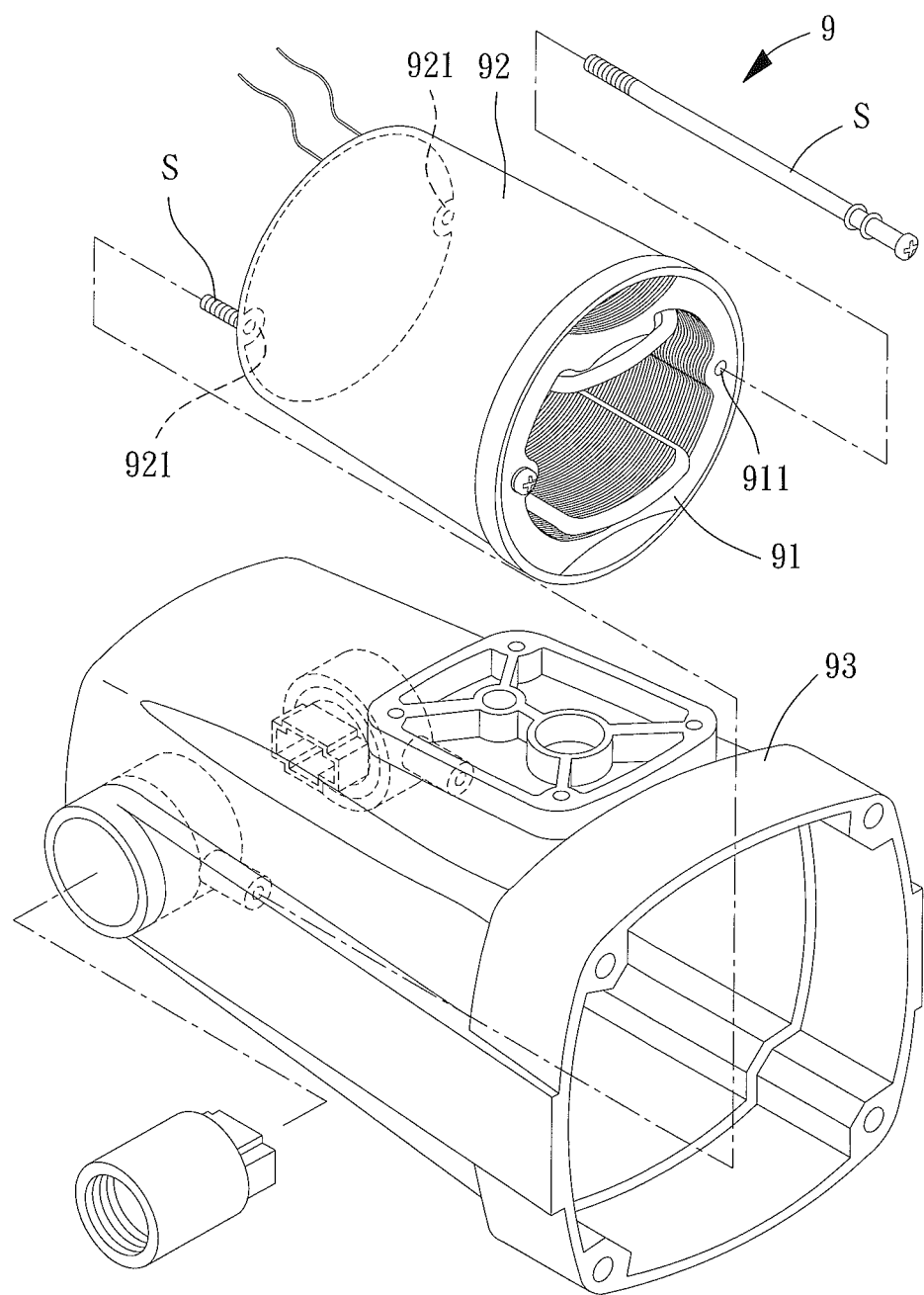
FIG. 1 is a cross sectional view of a conventional inner-rotor motor.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 2:
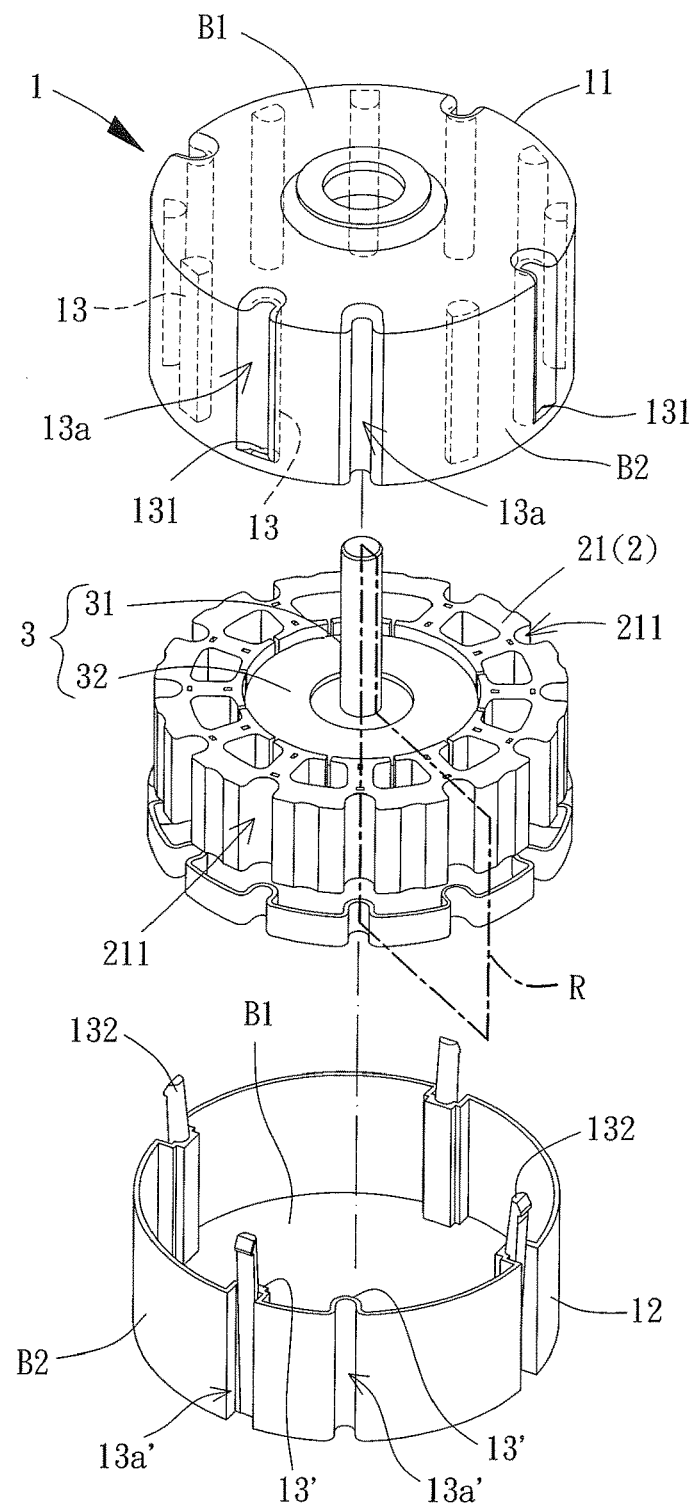
FIG. 2 is an exploded view of an inner-rotor motor according to a first embodiment of the present invention.
Figure 3:
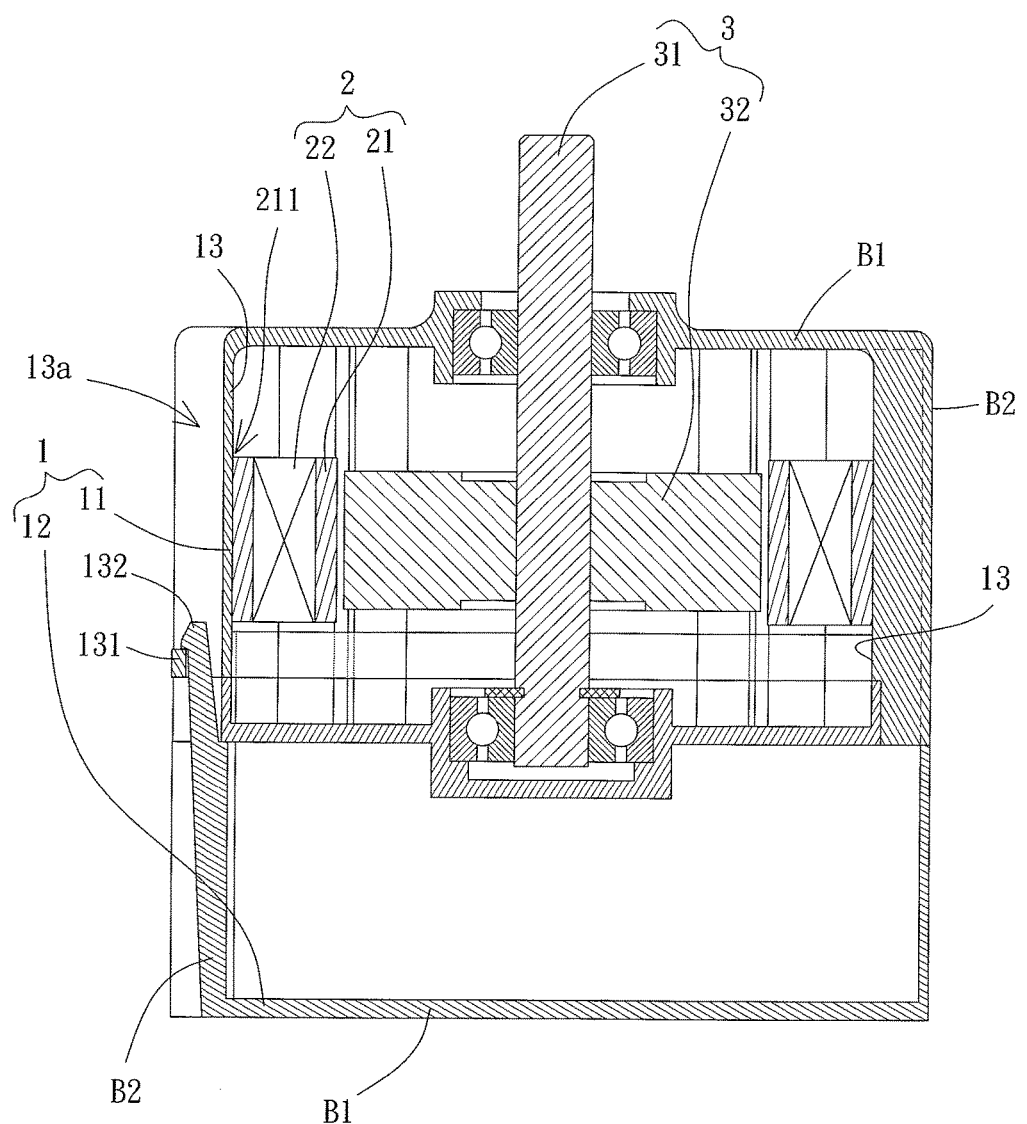
FIG. 3 is a cross sectional view of the inner-rotor motor according to the first embodiment of the present invention.

Please refer to FIGS. 2 and 3, an inner-rotor motor according to a first embodiment of the present invention includes a separating member 1, a stator 2 and a rotor 3. The stator 2 is received in the separating member 1, and the rotor 3 is rotatably coupled to the separating member 1.

The separating member 1 may be made of an insulating material such as plastic. Specifically, the separating member 1 may include a first separating part 11 and a second separating part 12 which can be coupled to each other to form the separating member 1. The first separating part 11 includes a base plate B1 extending along a radial direction of the inner-rotor motor. A lateral wall B2 is connected to and extends from an outer edge of the base plate B1 toward the second separating part 12 along an axial direction of the inner-rotor motor, such that the first separating part 11 is in the form shown in FIG. 3. The first and second separating parts 11 and 12 are coupled to each other via the lateral wall B2 of the first separating part 11 along the axial direction of the inner-rotor motor. Thus, the first and second separating parts 11 and 12 jointly define a space for receiving the stator 2. At least one first engaging portion 13 is arranged on the lateral wall B2 of the first separating part 11 and extends along the axial direction of the inner-rotor motor.

The stator 2 includes an iron core 21 received in the separating member 1. Namely, the iron core 21 is received in the space defined by the first and second separating parts 11 and 12, such that the iron core 21 can be completely enclosed by said separating parts 11 and 12. At least one engaging groove 211 is arranged on an outer surface of the iron core 21 and extends along the axial direction of the inner-rotor motor for receiving the at least one first engaging portion 13 of the separating member 1.

More specifically, the at least one engaging groove 211 is formed on the outer surface of the iron core 21, and the at least one first engaging portion 13 protrudes from an inner surface of the lateral wall B2 of the first separating part 11 toward the iron core 21. The at least one first engaging portion 13 protrudes toward the iron core 21 and structurally corresponds to the shape of the at least one groove 211, to be received in the at least one engaging groove 211. Additionally, the amount of the at least one engaging groove 211 may be equal to or larger than the amount of the at least one first engaging portion 13. Preferably, the amount of the at least one engaging groove 211 is equal to the amount of the at least one first engaging portion 13, such that each of the at least one first engaging portion 13 can be received in a respective one of the at least one engaging groove 211.

The rotor 3 is rotatably coupled to the separating member 1 and includes a shaft 31 and a permanent magnet assembly 32. The shaft 31 is arranged at a center of the permanent magnet assembly 32 received in the space defined by the first and second separating parts 11 and 12. Specifically, the shaft 31 is rotatably coupled to the first separating part 11 or the second separating part 12, and the permanent magnet assembly 32 may be coupled to an outer surface of the shaft 31. In this arrangement, a gap is formed between the permanent magnet assembly 32 and the iron core 21 of the stator 2, thus forming the inner-rotor motor according to the first embodiment of the present invention. The shaft 31 extends through a center of the iron core 21 and may extend out of the separating member 1 through the first separating part 11 or the second separating part 12. It is noted that the at least one groove 211 of the iron core 21 extends towards the shaft 31. Specifically, a reference plane "R" is defined to pass each engaging groove 211 and the shaft 31. Based on this, the part of the engaging groove to the left of the reference plane "R" is symmetric to the part of the engaging groove 211 to the right of the reference plane "R."

When the inner-rotor motor according to the first embodiment of the present invention is in use, an electromagnetic effect is generated between the iron core 21 and the permanent magnet assembly 32 when a coil wound around the iron core 21 is electrified. Thus, the shaft 31 is driven to rotate relative to the iron core 21. The operational principles and detailed structures of the stator 2 and the rotor 3 are not discussed herein, since it can be readily appreciated by ordinarily skilled persons in the art.

According to the arrangement described above, when the inner-rotor motor according to the first embodiment of the present invention is assembled, it is simply required to place the iron core 21 in the separating member 1, and each first engaging portion 13 of the separating member 1 is therefore received in a corresponding engaging groove 211 of the iron core 21, thus fixing the iron core 21 relative to the separating member 1. Therefore, it prevents the iron core 21 from rotating relative to the separating member 1. In addition, the at least one engaging groove 211 may include a plurality of engaging grooves 211, and the at least one first engaging portion 13 may include a plurality of first engaging portions 13 each received in a respective one of the plurality of engaging grooves 211 in order to enhance the engagement between the separating member 1 and the iron core 21.

Likewise, the second separating part 12 also includes a base plate B1 extending along the radial direction of the inner-rotor motor. In addition, a lateral wall B2 is connected to and extends from the base plate B1 towards the first separating part 11 along the axial direction of the inner-rotor motor, such that the second separating part 12 is in the form shown in FIG. 3. Furthermore, the separating member 1 further includes at least one second engaging portion 13' arranged at the lateral wall B2 of the second separating part 12 and extending along the axial direction of the inner-rotor motor. The at least one first engaging portion 13 of the first separating part 11 is aligned with the at least one second engaging portion 13' of the second separating part 12. Due to the arrangement of the at least one second engaging portion 13' on the lateral wall B2 of the second separating part 12, the second separating part 12 can be coupled with other components of the inner-rotor motor via the second engaging portion 13', such as a motor base.

Specifically, the amount of the at least one first engaging portion 13 may be larger than or equal to that of the second engaging portion 13'. Preferably, the amount of the at least one first engaging portion 13 is equal to the amount of the at least one second engaging portion 13', such that each of the at least one second engaging portion 13' is aligned with a respective one of the at least one first engaging portion 13 along the radial direction of the inner-rotor motor. Namely, the first separating part 11 may include a plurality of first engaging portions 13, and the second separating part 12 may include a plurality of second engaging portions 13' each aligned with a respective one of the plurality of first engaging portions 13 along the axial direction of the inner-rotor motor.

Moreover, the at least one first engaging portion 13 of the first separating part 11 may include a first channel 13a. The first channel 13a may be in the form of a receiving groove. Namely, the first channel 13a is formed on the outer surface of the lateral wall B2. The at least one second engaging portion 13' of the second separating part 12 may also include a second channel 13a' formed on the outer surface of the lateral wall B2. When the at least one first engaging portion 13 includes a plurality of first engaging portions 13, one of the plurality of first engaging portions 13 may include the channel 13a while the others do not. In another case, in the plurality of first engaging portions 13, there may be more than one first engaging portion 13 each including the channel 13a. In a further case, each of the plurality of first engaging portions 13 may include the channel 13a. Likewise, the at least one second engaging portion 13' of the second separating part 12 may have a similar arrangement as the at least one first engaging portion 13 of the first separating part 11. Since the first channel 13a is in the form of the receiving groove having an opening, other structures or components may be received in the channel 13a via the opening.

Since the at least one second engaging portion 13' is aligned with the at least one first engaging portion 13 along the axial direction of the inner-rotor motor, the first and second separating parts 11 and 12 may respectively include the first and second channels 13a and 13a' aligned with each other along the axial direction of the inner-rotor motor. In such a case, the first channel 13a of the first separating part 11 may include a first coupling portion 131, and the second channel 13a' of the second separating part 12 may include a second coupling portion 132 coupled to the first coupling portion 131. More specifically, the first and second coupling portions 131 and 132 may be in the form of a fastener and a fastening groove, such that the first and second coupling portions 131 and 132 can be engaged to each other via the fastener and the fastening groove. In this embodiment, the first coupling portion 131 is a fastener, and the second coupling portion 132 is a fastening groove engaged with the fastener.

In the first embodiment of the present invention, the at least one first engaging portion 13 and the at least one second engaging portion 13' align with each other and respectively include the first and second channels 13a and 13a', and the first and second channels 13 and 13a' respectively include the first and second coupling portions 131 and 132. As such, the first and second separating parts 11 and 12 may be coupled to each other via the first and second coupling portions 131 and 132, thus further enhancing the engagement therebetween. Since the first coupling portion 131 can be fastened to the second coupling portion 132, the use of the first and second coupling portions 131 and 132 will not affect the assembly convenience of the inner-rotor motor. Furthermore, since the first coupling portion 131 is arranged in the first channel 13a, the first coupling portion 131 will not be arranged outwards of the outer surface of the lateral wall B2 of the first separating part 11. Likewise, the second coupling portion 132 is arranged in the second channel 13a', therefore, the second coupling portion 132 will not be arranged outwards of the outer surface of the lateral wall B2 of the second separating part 12. In other words, since the first and second coupling portions 131 and 132 are not arranged outwards of the outer surface of the separating member 1, arrangement of the first and second coupling portions 131 and 132 will not increase the radial width of the inner-rotor motor according to the first embodiment of the present invention.

Figure 4:
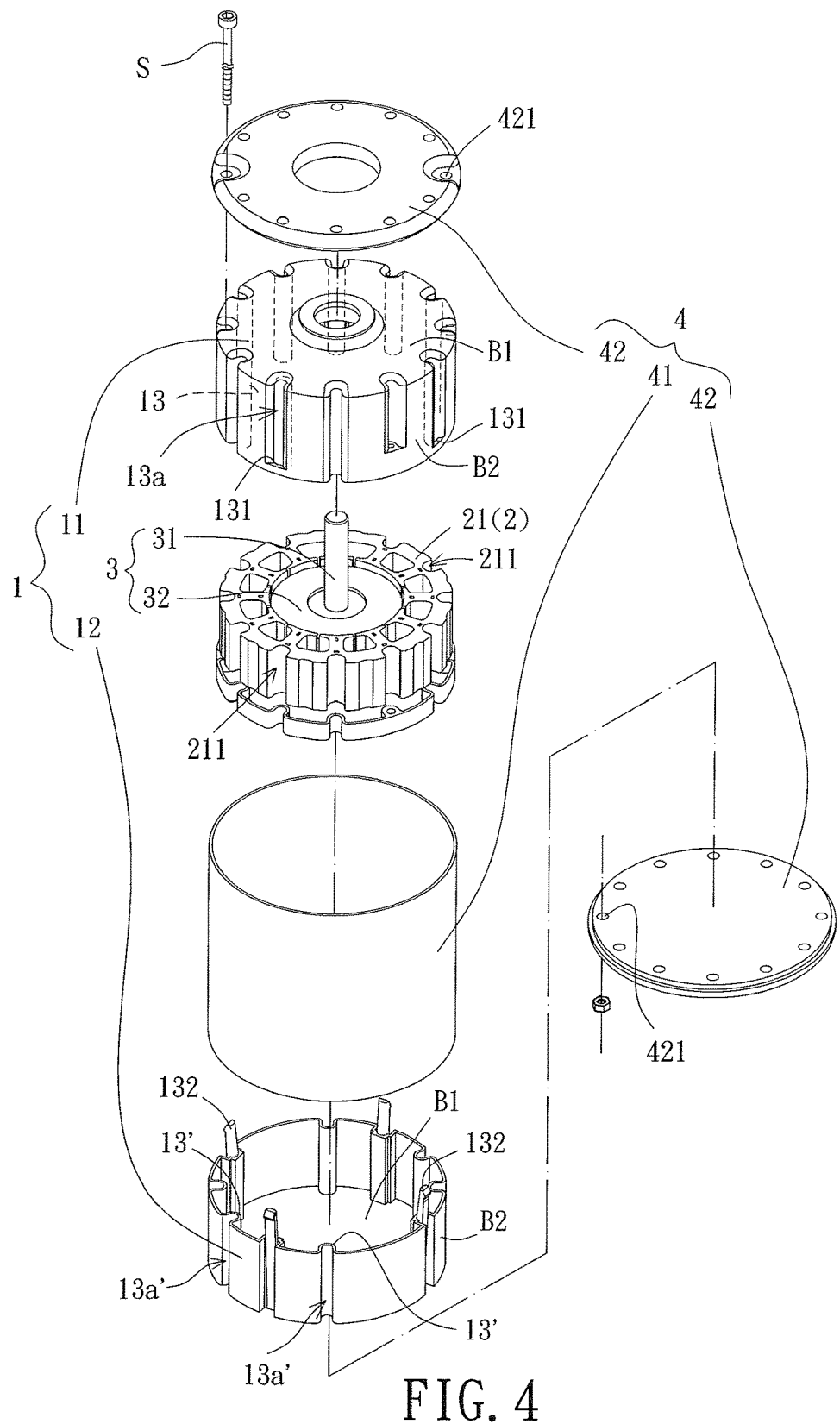
FIG. 4 is an exploded view of an inner-rotor motor according to a second embodiment of the present invention.
Figure 5:
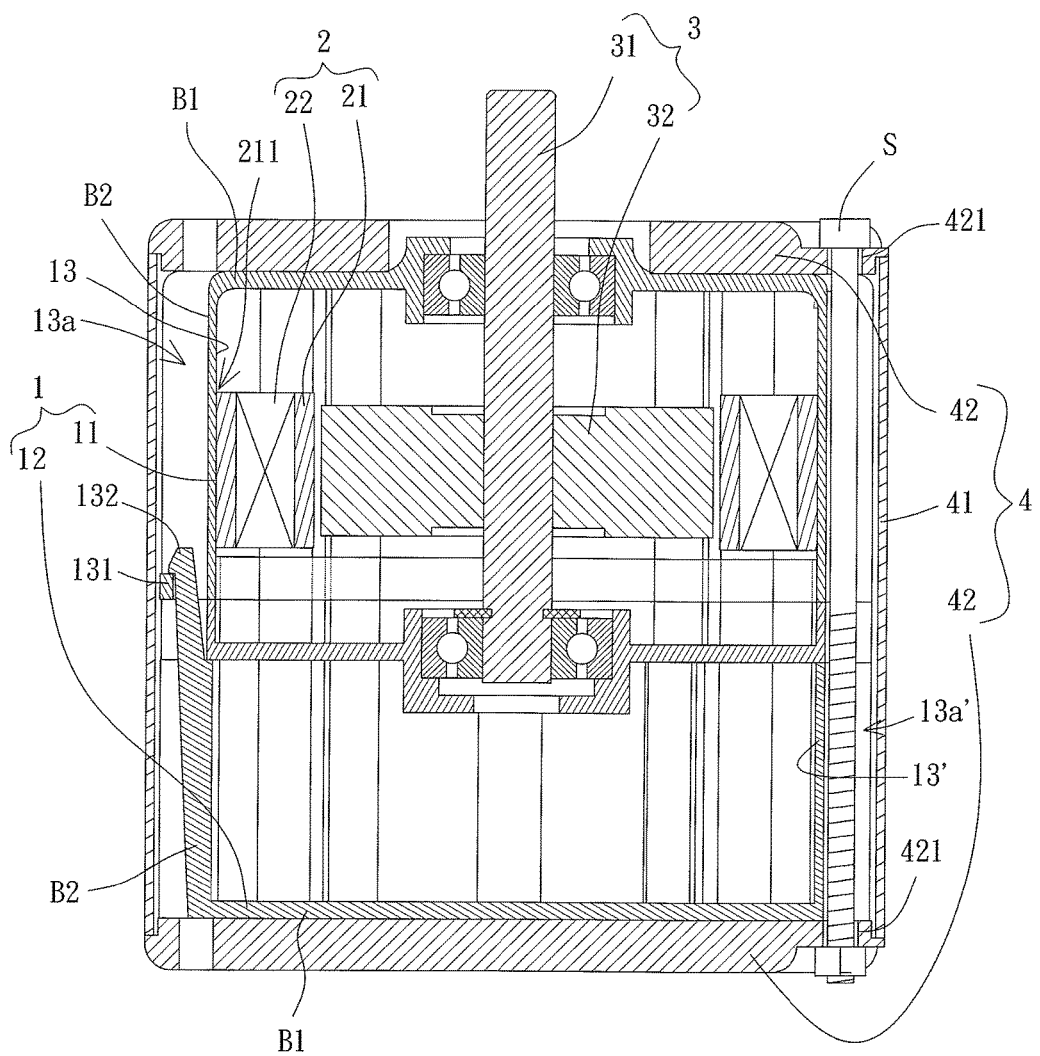
FIG. 5 is a cross sectional view of the inner-rotor motor according to the second embodiment of the present invention.

Please refer to FIGS. 4 and 5, an inner-rotor motor according to a second embodiment of the present invention further includes a metallic housing 4, which is different from the first embodiment. The metallic housing 4 is adapted to receive the separating member 1 (including the stator 2 and the permanent magnet assembly 32 of the rotor 3). The metallic housing 4 may be coupled to the separating member 1 by screwing, engagement, press fitting or tenoning for providing a high structural strength of the inner-rotor motor, thus achieving a better protecting effect. In this embodiment, an insulating effect of the inner-rotor motor is provided via the use of the separating member 1, thus preventing a leakage current between the stator 2 and the metallic housing 4.

In this embodiment, a screwing member "S" extends through the metallic housing 4 and the first channel 13a for fastening the separating member 1 in the metallic housing 4. Specifically, the at least one first engaging portion 13 includes a plurality of first engaging portions 13, and the at least one second engaging portion 13' includes a plurality of second engaging portions 13'. One of the first engaging portions 13 includes the first channel 13a. Likewise, one of the second engaging portions 13' includes the second channel 13a'. In addition, the first engaging portion 13 aligns with the second engaging portion 13', such that the first channel 13a communicates with the second channel 13a'. In this arrangement, the screwing member "S" extends through the first and second channels 13a and 13a' to fasten the separating member 1 in the metallic housing 4.

The metallic housing 4 includes a body 41 in the form of a hollow cylinder having two openings formed at two opposite ends thereof. The body 41 encloses the first and second separating parts 11 and 12, and includes two lids 42 respectively coupled with the two openings. Each lid 42 includes at least one fastening hole 421 arranged at an outer edge thereof and aligned with the at least one first engaging portion 13 and the at least one second engaging portion 13'. As such, the screwing member "S" extends through the at least one fastening hole 421 of each of the two lids 42, to sandwich the separating member 1 between said two lids 42.

In the inner-rotor motor according to the second embodiment of the present invention, the separating member 1 is fastened in the metallic housing 4 by the screwing member "S." The screwing member "S" extends through the first and second channels 13a and 13a' and is not arranged outwards of the outer surfaces of the lateral walls B2 of the first and second separating parts 11 and 12. Thus, arrangement of the screwing member "S" does not increase the radial width of the inner-rotor motor according to the second embodiment. As a conclusion, the use of the screwing member "S" will not increase the total volume of the inner-rotor motor in the second embodiment.

Figure 6:
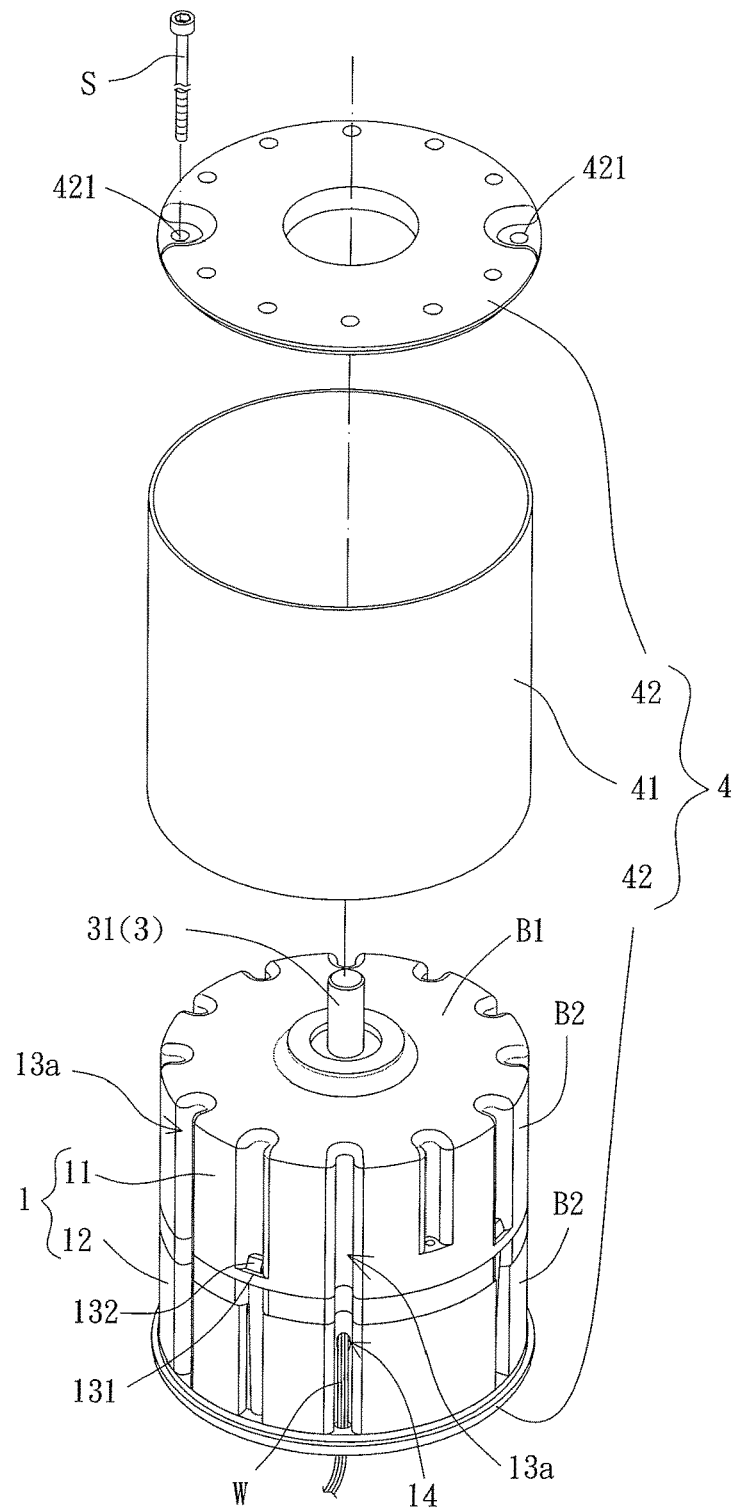
FIG. 6 is an exploded view of an inner-rotor motor according to a third embodiment of the present invention.
Figure 7:
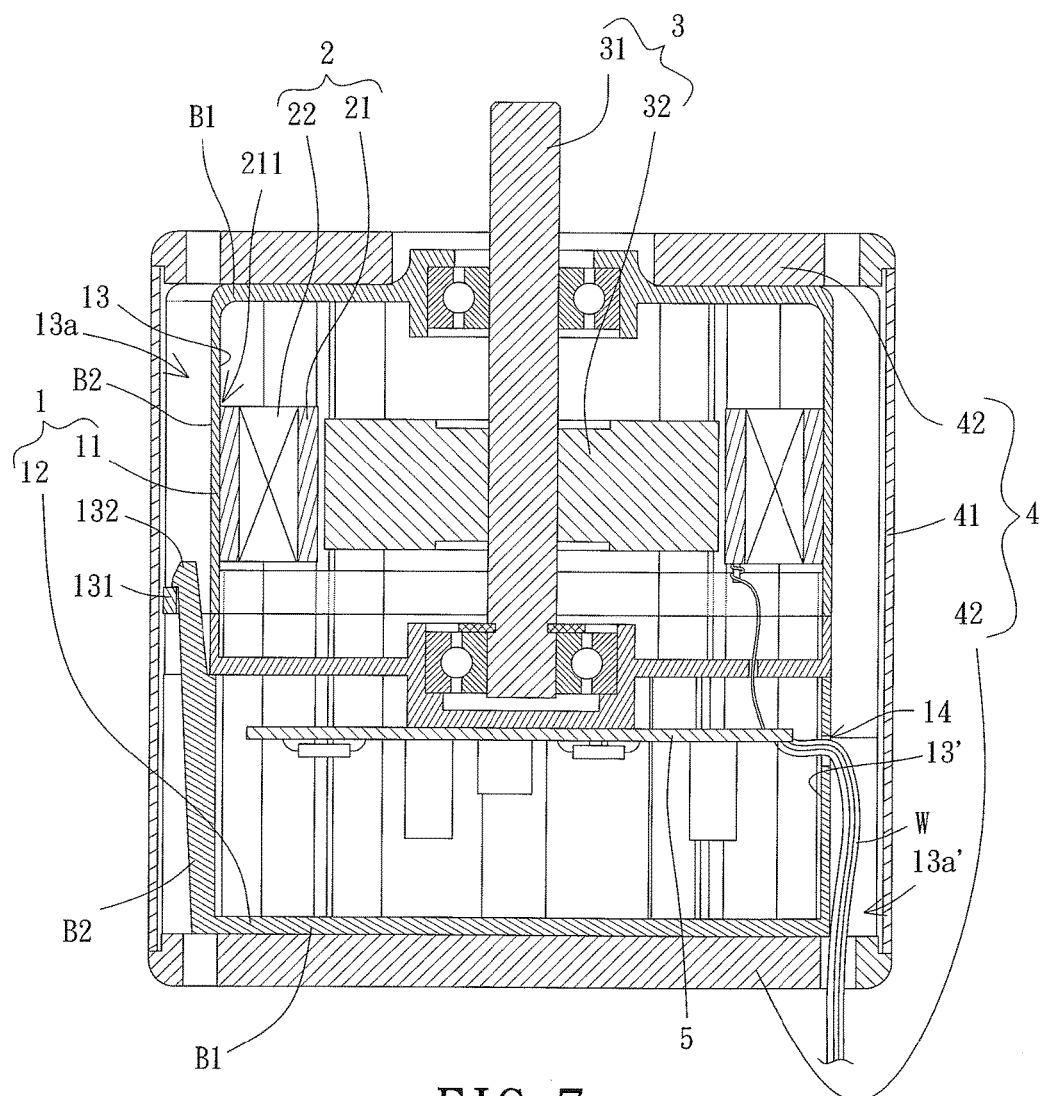
FIG. 7 is a cross sectional view of the inner-rotor motor according to the third embodiment of the present invention.

Please refer to FIGS. 6 and 7, an inner-rotor motor according to a third embodiment of the present invention differs from the second embodiment in that the separating member 1 further includes a through-hole 14. The through-hole 14 may be arranged on the first separating part 11 or the second separating part 12. A wire "W" may extend out of the separating member 1 via the through-hole 14 and may reach the metallic housing 4. The wire "W" may be received in the first channel 13a or the second channel 13a'. Specifically, the inner-rotor motor of the third embodiment further includes a circuit board 5 that is received in the space defined by the first and second separating parts 11 and 12 and is electrically connected with one end of the wire "W." The through-hole 14 may be arranged on the lateral wall B2 of the second separating part 12 and may communicate with the second channel 13a', such that the other end of the wire "W" may extend out of the separating member 1 along the second channel 13a' and is located between the separating member 1 and the metallic housing 4. In this arrangement, a power source or a controller outside the inner-rotor motor can be provided or electrically connected to the circuit board 5 via the wire "W." However, the through-hole 14 can be arranged on the lateral wall B2 of the first separating part 11 and can communicate with the first channel 13a, which is not taken as a limited sense.

Similarly, a coil 22 may be wound around an outer periphery of the iron core 21 of the stator 2. One end of the wire "W" may be electrically connected to the coil 22, while the other end extends out of the inner-rotor motor along the first channel 13a or the second channel 13a' of the separating member 1. Thus, a power source or a controller outside the inner-rotor motor can be provided to or electrically connected to the coil 22 via the wire "W."

In the inner-rotor motor according to the third embodiment of the present invention, the wire "W" extends through the through-hole 14 of the separating member 1 and is received in the first channel 13a or the second channel 13a'. Thus, the wire "W" is able to extend out of the inner-rotor motor along said channel 13a or 13a' of the separating member 1. In this arrangement, a predetermined space for the wire "W" between the separating member 1 and the metallic housing 4 is not necessary. Therefore, arrangement of the wire "W" does not increase the total volume of the inner-rotor motor.

Figure 8:
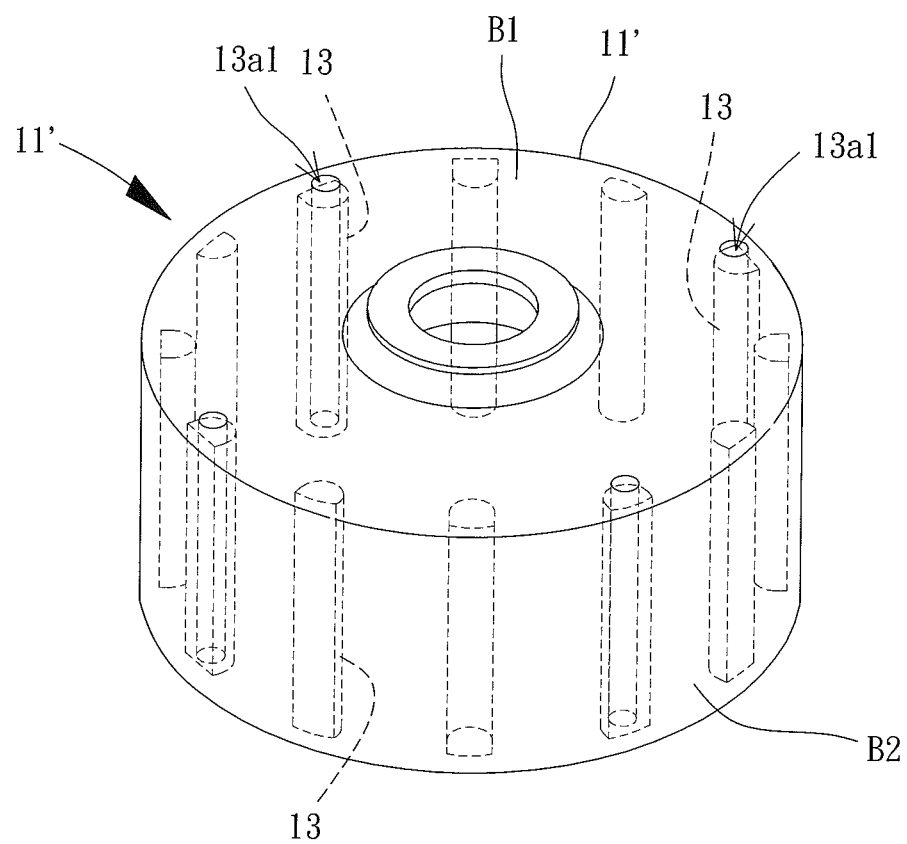
FIG. 8 is a perspective view of a first separating part according to another implementation of the present invention.

Please refer to FIG. 8, in another implementation of the present invention, a first separating part 11' is similar to the first separating part 11 described above except that the first separating part 11' includes a first channel 13a1 being in the form of an extending hole. In other words, the first channel 13a1 extends through two opposite sides of the at least one first engaging portion 13 along the axial direction of the inner-rotor motor. As such, the appearance integrity of the first separating part 11' is not adversely affected by the arrangement of the first channel 13a1. The first channel 13a1 may also be adapted to receive the first coupling portion 131, the screwing member "S" or the wire "W." Likewise, the second separating 12 may also include the second channel (not shown) in the form of an extending hole extending through two opposite sides of the at least one second engaging portion 13' along the axial direction of the inner-rotor motor.

According to the present invention, the separating member 1 includes at least one first engaging portion 13 arranged on the inner surface and protruding inwards towards the iron core. The at least one first engaging portion 13 may be in the form of a solid post extending along the axial direction of the inner-rotor motor. Alternatively, the at least one first engaging portion 13 may include a first channel 13a or 13a1. The first channel 13a may be in the form of the receiving channel formed on the outer surface of the separating member 1. On the other hand, the first channel 13a1 may be in the form of the extending hole extending through the two opposite sides of the at least one first engaging portion 13 along the axial direction of the inner-rotor motor.

According to the arrangement described above, the inner-rotor motor of the present invention is characterized as follows. The separating member 1 includes the at least one first engaging portion 13 arranged at the first separating part 11, and the iron core 21 includes the at least one engaging groove 211 arranged at the outer surface thereof. The at least one first engaging portion 13 and the at least one engaging groove 211 extend along the axial direction of the inner-rotor motor, and the at least one first engaging portion 13 is received in the at least one engaging groove 211. Thus, the iron core 21 is fixed relative to the separating member 1, and relative rotation therebetween is also prevented. With comparison to the conventional inner-rotor motor 9 where the separating member 92 has to be screwed to the stator 91, the iron core 21 and the separating member 1 in the inner-rotor motor of the present invention do not need to be coupled to each other by screwing, thus providing a convenient assembly.

Additionally, the second separating part 12 may also include the at least one second engaging portion 13' aligned with the at least one first engaging portion 13 along the axial direction of the inner-rotor motor. The at least one first engaging portion 13 and the at least one second engaging portion 13' may include the first and second channels 13a and 13a', respectively. According to the second embodiment of the present invention, the inner-rotor motor further includes the metallic housing 4 and the screwing member "S" for fastening the separating member 1 in the metallic housing 4. The screwing member "S" extends through the first and second channels 13a and 13a'. Since the screwing member "S" is not arranged outwards of the outer surface of the separating member 1, the radial width of the inner-rotor motor will not be increased. With comparison to the traditional inner-rotor motor 9 where the use of screwing member "S" increases the total volume thereof, the volume of the inner-rotor motor is certainly reduced in the present invention.

Furthermore, due to the arrangement of the wire "W" that extends through the through-hole 14 of the separating member 1 and is received in the first channel 13a or the second channel 13a', the wire "W" is able to extend out of the inner-rotor motor along said channel 13a or 13a'. With comparison to the traditional inner-rotor motor 9 where it is required to maintain a space between the separating member 92 and the metallic housing 93, a predetermined space for the wire "S" between the separating member 1 and the metallic housing 4 is not needed in the present invention, thus significantly reducing the total volume of the inner-rotor motor.

As a conclusion, the inner-rotor motor of the present invention provides a convenient assembly and a reduced volume.

Although the invention has been described in detail with reference to its presently preferable embodiments, it will be understood by one of ordinary skill in the art that various modifications can be made without departing from the spirit and the scope of the invention, as set forth in the appended claims.

What is claimed is:
1. An inner-rotor motor comprising:
a separating member made of an insulating material and comprising a first separating part and a second separating part, wherein the separating member comprises at least one engaging portion extending along an axial direction of the inner-rotor motor, wherein the first separating part comprises a base plate extending along a radial direction of the inner-rotor motor, wherein a lateral wall is connected to the base plate and extends along the axial direction of the inner-rotor motor towards the second separating part, wherein the at least one engaging portion comprises a plurality of first engaging portions arranged on the lateral wall of the first separating part, wherein the first separating part comprises a first channel arranged at one of the plurality of first engaging portions, wherein the second separating part comprises a base plate extending along the radial direction of the inner-rotor motor, wherein a lateral wall is connected to the base plate of the second separating part and extends along the axial direction of the inner-rotor motor towards the first separating part, wherein the at least one engaging portion further comprises a plurality of second engaging portions aligned with the plurality of first engaging portions along the axial direction of the inner-rotor motor, wherein the plurality of second engaging portions is arranged on the lateral wall of the second separating part and extends along the axial direction of the inner-rotor motor, and wherein the second separating part comprises a second channel arranged at one of the plurality of second engaging portions;
a stator comprising an iron core received in a space jointly defined by the first and second separating parts, wherein the iron core comprises a plurality of engaging grooves arranged on an outer surface thereof and extending along the axial direction of the inner-rotor motor, and wherein the plurality of first engaging portions and the plurality of second engaging portions are received in the plurality of engaging grooves;
a rotor rotatably coupled to the separating member; and
a metallic housing receiving the separating member.
2. The inner-rotor motor as claimed in claim 1, wherein the first separating part comprises a first coupling portion arranged in the first channel, and wherein the second separating part comprises a second coupling portion arranged in the second channel and coupled to the first coupling portion.
3. The inner-rotor motor as claimed in claim 2, wherein the first coupling portion is in a form of a fastener, wherein the second coupling portion is in a form of a fastening groove, and wherein the first and second coupling portions are coupled to each other via the fastener and the fastening groove.
4. The inner-rotor motor as claimed in claim 1, wherein the rotor comprises a shaft arranged at a center of the iron core, wherein the plurality of engaging grooves extends towards the shaft, and wherein the plurality of first engaging portions and the plurality of second engaging portions protrude inwards towards the iron core.

5. The inner-rotor motor as claimed in claim 1, wherein a quantity of the plurality of first engaging portions is equal to or larger than a quantity of the plurality of second engaging portions.

6. The inner-rotor motor as claimed in claim 1, wherein a screwing member extends through the metallic housing, the first channel and the second channel to fasten the separating member in the metallic housing.

7. The inner-rotor motor as claimed in claim 6, wherein the metallic housing comprises a body in a form of a hollow cylinder having two openings formed at two opposite ends thereof, wherein the body encloses the first and second separating parts of the separating member, wherein two lids are arranged respectively at the two openings of the body, wherein each of the two lids comprises a fastening hole arranged at an outer area adjacent to an outer edge thereof, wherein the fastening hole is aligned with the one of the plurality of first engaging portions and the one of the plurality of second engaging portions along the axial direction of the inner-rotor motor, and wherein the screwing member extends through the fastening holes of the two lids to fix the separating member between the two lids.

8. An inner-rotor motor comprising:
a separating member made of an insulating material and comprising a first separating part and a second separating part, wherein the separating member comprises at least one engaging portion extending along an axial direction of the inner-rotor motor, wherein the first separating part comprises a base plate extending along a radial direction of the inner-rotor motor, wherein a lateral wall is connected to the base plate and extends along the axial direction of the inner-rotor motor towards the second separating part, wherein the at least one engaging portion comprises a plurality of first engaging portions arranged on the lateral wall of the first separating part, wherein the first separating part comprises a first channel arranged at one of the plurality of first engaging portions, wherein the second separating part comprises a base plate extending along the radial direction of the inner-rotor motor, wherein a lateral wall is connected to the base plate of the second separating part and extends along the axial direction of the inner-rotor motor towards the first separating part, and wherein the at least one engaging portion further comprises a plurality of second engaging portions aligned with the plurality of first engaging portions along the axial direction of the inner-rotor motor, wherein the plurality of second engaging portions is arranged on the lateral wall of the second separating part and extends along the axial direction of the inner-rotor motor, and wherein the second separating part comprises a second channel arranged at one of the plurality of second engaging portions;
a stator comprising an iron core received in a space jointly defined by the first and second separating parts, wherein the iron core comprises a plurality of engaging grooves arranged on an outer surface thereof and extending along the axial direction of the inner-rotor motor, and wherein the plurality of first engaging portions and the plurality of second engaging portions are received in the plurality of engaging grooves; and
a rotor rotatably coupled to the separating member,
wherein the separating member further comprises a through-hole arranged at the first separating part or the second separating part, wherein a wire extends out of the separating member via the through-hole, and wherein the wire is received in the first channel or the second channel.

9. The inner-rotor motor as claimed in claim 8, wherein the rotor comprises a shaft arranged at a center of the iron core, wherein the plurality of engaging grooves extends towards the shaft, and wherein the plurality of first engaging portions and the plurality of second engaging portions protrude inwards towards the iron core.

10. The inner-rotor motor as claimed in claim 8, further comprising a circuit board received in the space defined by the first and second separating parts together, wherein one end of the wire is electrically connected to the circuit board, and wherein another end of the wire extends along the first channel or the second channel.

11. The inner-rotor motor as claimed in claim 8, wherein a coil is arranged around an outer periphery of the iron core of the stator, wherein one end of the wire is electrically connected to the coil, and wherein another end of the wire extends along the first channel or the second channel.

12. The inner-rotor motor as claimed in claim 8, wherein a quantity of the plurality of first engaging portions is equal to or larger than a quantity of the plurality of second engaging portions.

13. The inner-rotor motor as claimed in claim 8, wherein the first separating part comprises a first coupling portion arranged in the first channel, and wherein the second separating part comprises a second coupling portion arranged in the second channel and coupled to the first coupling portion.

14. An inner-rotor motor comprising:
a separating member made of an insulating material and comprising a first separating part and a second separating part, wherein the separating member comprises at least one engaging portion extending along an axial direction of the inner-rotor motor, wherein the first separating part comprises a base plate extending along a radial direction of the inner-rotor motor, wherein a lateral wall is connected to the base plate and extends along the axial direction of the inner-rotor motor towards the second separating part, wherein the at least one engaging portion comprises a plurality of first engaging portions arranged on the lateral wall of the first separating part, wherein the first separating part comprises a first channel arranged at one of the plurality of first engaging portions, wherein the second separating part comprises a base plate extending along the radial direction of the inner-rotor motor, wherein a lateral wall is connected to the base plate of the second separating part and extends along the axial direction of the inner-rotor motor towards the first separating part, and wherein the at least one engaging portion further comprises a plurality of second engaging portions aligned with the plurality of first engaging portions along the axial direction of the inner-rotor motor, wherein the plurality of second engaging portions is arranged on the lateral wall of the second separating part and extends along the axial direction of the inner-rotor motor, and wherein the second separating part comprises a second channel arranged at one of the plurality of second engaging portions;
a stator comprising an iron core received in a space jointly defined by the first and second separating parts, wherein the iron core comprises a plurality of engaging grooves arranged on an outer surface thereof and extending along the axial direction of the inner-rotor motor, and wherein the plurality of first engaging portions and the plurality of second engaging portions are received in the plurality of engaging grooves; and a rotor rotatably coupled to the separating member, wherein the first channel is in a form of a receiving groove formed on an outer surface of the lateral wall of the first separating part, and wherein the second channel is also in a form of a receiving groove formed on an outer surface of the lateral wall of the second separating part.

15. The inner-rotor motor as claimed in claim 14, wherein the rotor comprises a shaft arranged at a center of the iron core, wherein the plurality of engaging grooves extends towards the shaft, and wherein the plurality of first engaging portions and the plurality of second engaging portions protrude inwards towards the iron core.

16. The inner-rotor motor as claimed in claim 14, wherein a quantity of the plurality of first engaging portions is equal to or larger than a quantity of the plurality of second engaging portions.

17. The inner-rotor motor as claimed in claim 14, wherein the first separating part comprises a first coupling portion arranged in the first channel, and wherein the second separating part comprises a second coupling portion arranged in the second channel and coupled to the first coupling portion.

18. An inner-rotor motor comprising:

a separating member made of an insulating material and comprising a first separating part and a second separating part, wherein the separating member comprises at least one engaging portion extending along an axial direction of the inner-rotor motor, wherein the first separating part comprises a base plate extending along a radial direction of the inner-rotor motor, wherein a lateral wall is connected to the base plate and extends along the axial direction of the inner-rotor motor towards the second separating part, wherein the at least one engaging portion comprises a plurality of first engaging portions arranged on the lateral wall of the first separating part, wherein the first separating part comprises a first channel arranged at one of the plurality of first engaging portions, wherein the second separating part comprises a base plate extending along the radial direction of the inner-rotor motor, wherein a lateral wall is connected to the base plate of the second separating part and extends along the axial direction of the inner-rotor motor towards the first separating part, and wherein the at least one engaging portion further comprises a plurality of second engaging portions aligned with the plurality of first engaging portions along the axial direction of the inner-rotor motor, wherein the plurality of second engaging portions is arranged on the lateral wall of the second separating part and extends along the axial direction of the inner-rotor motor, and wherein the second separating part comprises a second channel arranged at one of the plurality of second engaging portions;

a stator comprising an iron core received in a space jointly defined by the first and second separating parts, wherein the iron core comprises a plurality of engaging grooves arranged on an outer surface thereof and extending along the axial direction of the inner-rotor motor, and wherein the plurality of first engaging portions and the plurality of second engaging portions are received in the plurality of engaging grooves; and a rotor rotatably coupled to the separating member, wherein the first channel is in a form of an extending hole extending through two opposite sides of the one of the plurality of first engaging portions along the axial direction of the inner-rotor motor, and wherein the second channel is in a form of another extending hole extending through two opposite sides of the one of the plurality of second engaging portions along the axial direction of the inner-rotor motor.

19. The inner-rotor motor as claimed in claim 18, wherein the rotor comprises a shaft arranged at a center of the iron core, wherein the plurality of engaging grooves extends towards the shaft, and wherein the plurality of first engaging portions and the plurality of second engaging portions protrude inwards towards the iron core.

20. The inner-rotor motor as claimed in claim 18, wherein a quantity of the plurality of first engaging portions is equal to or larger than a quantity of the plurality of second engaging portions.

* * * * *